(12) United States Patent
Sung

(10) Patent No.: US 9,917,925 B2
(45) Date of Patent: Mar. 13, 2018

(54) METHOD FOR DETERMINING MAXIMUM SEGMENT SIZE

(71) Applicant: Accton Technology Corporation, Hsinchu (TW)

(72) Inventor: Chien-Fu Sung, New Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 245 days.

(21) Appl. No.: 14/717,022

(22) Filed: May 20, 2015

(65) Prior Publication Data

US 2015/0365503 A1 Dec. 17, 2015

(30) Foreign Application Priority Data

Jun. 12, 2014 (TW) .............................. 103120301 A

(51) Int. Cl.
*H04L 29/06* (2006.01)
*H04W 24/08* (2009.01)

(52) U.S. Cl.
CPC ............ *H04L 69/16* (2013.01); *H04L 69/168* (2013.01); *H04W 24/08* (2013.01)

(58) Field of Classification Search
None
See application file for complete search history.

(56) References Cited

U.S. PATENT DOCUMENTS

| 6,973,097 | B1 | 12/2005 | Donzis et al. | |
| 7,330,426 | B2* | 2/2008 | Berzosa | H04L 43/0864 370/229 |
| 7,912,911 | B2 | 3/2011 | Way et al. | |
| 8,102,768 | B2* | 1/2012 | Lee | H04L 69/16 370/235 |
| 8,134,945 | B2* | 3/2012 | Kim | H04B 7/026 370/310 |
| 2005/0265352 | A1* | 12/2005 | Biran | H04L 67/1097 370/395.52 |
| 2010/0290357 | A1 | 11/2010 | Yoon et al. | |
| 2012/0250703 | A1* | 10/2012 | Suzuki | H04L 47/36 370/474 |
| 2012/0281559 | A1* | 11/2012 | Ner | H04W 28/06 370/252 |

FOREIGN PATENT DOCUMENTS

TW 201318446 A1 5/2013

* cited by examiner

*Primary Examiner* — Steve R Young
(74) *Attorney, Agent, or Firm* — Birch, Stewart, Kolasch & Birch, LLP

(57) ABSTRACT

A method for determining a maximum segment size is disclosed. The method is used in an access point. The method includes: detecting a first MSS value between the access point and at least one device; setting a TCP MSS value of at least one TCP session established by the access point as a second MSS value; comparing the first MSS value with the second MSS value, and choosing a minimum value among the first MSS value and the second MSS value as a maximum value; and recording all the MSS values between the access point and the subsequent devices and the maximum value into a device MSS table.

6 Claims, 5 Drawing Sheets

METHOD FOR DETERMINING MAXIMUM SEGMENT SIZE

CROSS REFERENCE TO RELATED APPLICATIONS

This Application claims priority of Taiwan Patent Application No. 103120301, filed on Jun. 12, 2014, the entirety of which is incorporated by reference herein.

BACKGROUND OF THE INVENTION

Field of the Invention

Aspects of the present invention relate generally to wireless communications systems, and more particularly, to methods for determining a maximum segment size (MSS) in a communications system.

Description of the Related Art

Third generation (3G) and fourth generation (4G) wireless networks, as specified by the 3rd Generation Partnership Project (3GPP), include wireless access networks in which different application services (e.g., data services, voice over IP (VoIP) content, video content, etc.). Transmission Control Protocol (TCP) defines size limits of packets transmitted over a network. The maximum transmission unit (MTU) defines the maximum size of a packet that can be transmitted. The TCP maximum segment size (MSS) defines the maximum number of data bytes in a packet.

Typically, user terminals at the end terminals do not know the MTU size and the MSS value that a network or a network segment in the TCP path can accommodate, and, therefore, the user terminal operating the system selects a predetermined value as the MTU size. However, the predetermined value may prevent the packet from passing through the wireless access network. When a packet is too large (e.g., the packet exceeds the MTU size and/or MSS value), network devices may discard the packet because the packet exceeds the predetermined value.

Therefore, there is a need for a method for determining a maximum segment size (MSS) to solve the problem of discarding the packet because the packet exceeds the MTU size and/or MSS value.

BRIEF SUMMARY OF THE INVENTION

A detailed description is given in the following embodiments with reference to the accompanying drawings.

Methods for determining a maximum segment size (MSS) are provided.

In one exemplary embodiment, the invention is directed to a method for determining a maximum segment size (MSS), comprising: detecting a first MSS value between the access point and at least one subsequent device; setting a transmission control protocol (TCP) MSS value of at least one TCP session established by the access point as a second MSS value; comparing the first MSS value with the second MSS value, and choosing a minimum value among the first MSS value and the second MSS value as a maximum MSS value; and recording all the MSS values between the access point and the subsequent devices and the maximum MSS value into a device MSS table.

In one exemplary embodiment, the invention is directed to a method for determining a maximum segment size (MSS). The method is used in wireless communication system, comprising: detecting a first MSS value between an access point and at least one subsequent device by the access point; setting a transmission control protocol (TCP) MSS value of at least one TCP session established by the access point as a second MSS value; comparing the first MSS value with the second MSS value by the access point, and choosing a minimum value among the first and the second MSS values as a maximum MSS value; and recording all the MSS values between the access point and the subsequent devices and the maximum MSS value into a device MSS table by the access point.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
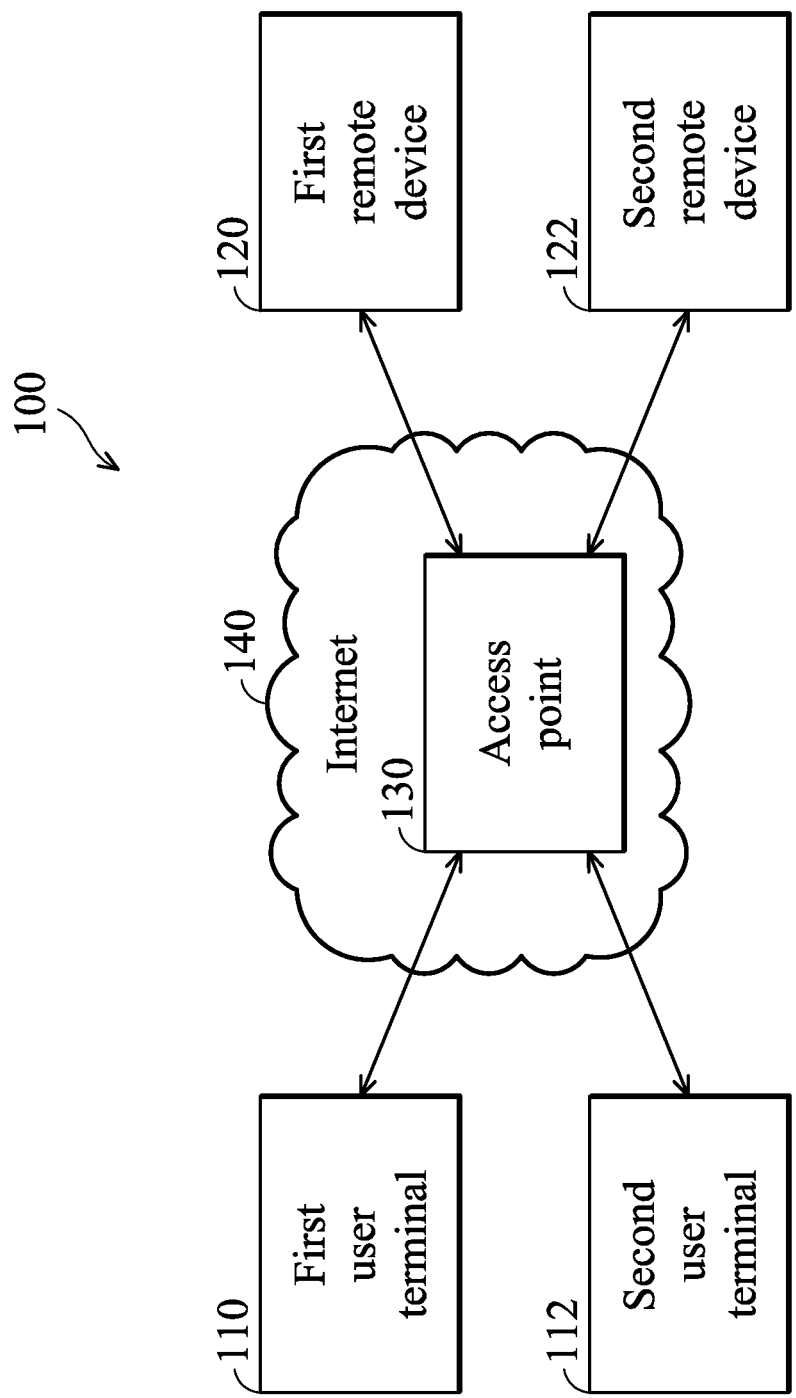
FIG. 1 is a schematic diagram illustrating a wireless communications system according to an exemplary embodiment of the present invention.

Several exemplary embodiments of the present disclosure are described with reference to FIGS. 1 through 5, which generally relate to methods for determining a maximum segment size (MSS) in a communications system. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 is a schematic diagram illustrating a wireless communications system 100 according to an exemplary embodiment of the present invention. The wireless communications system 100 at least includes a first user terminal 110, a second user terminal 112, a first remote device 120, a second remote device 122, and an access point 130. The first user terminal 110 and a second user terminal 112 are connected to the first remote device 120 and the second remote device 122, respectively, via the access point 130 in the Internet 140.

It is worth noting that, although only one access point device is described in the embodiment of FIG. 1, the technology in the invention can also be applied in any number and any type of access points existing in a peer-to-peer (P2P) network (e.g., the first user terminal 110 and the first remote device 120). The access point device may be a router, a gateway or another device.

In addition, the first user terminal 110 and the second user terminal 112 may be an electronic device having a network connection capability For example, personal computers, notebooks, tablet PCs, smart terminal devices and other devices which can be connected to the wireless network. The first remote device 120 and the second remote device 122 can be a switch, a network service device or other equipment provided by the network or the telecommunication service provider. It should be noted that the number of user terminals and remote devices described above are not limited to the figures and the contents of the invention.

In one embodiment of the invention, the access point 130 may act to intercept transmission control protocol synchronize (TCP SYN) and/or transmission control protocol synchronize-acknowledge (TCP SYN-ACK) messages between the first user terminal 110 and the first remote device 120 and/or between the second user terminal 112 and the second remote device 122 when reading packets transmitted between the user terminals and the remote devices. The access point 130 may further inspect TCP headers in the TCP SYN and/or TCP SYN-ACK messages and adjust maximum segment size (MSS) values in the headers so that the packet can pass through the Internet. It should be noted that changes and updates made by the access point 130 may be transparent to the user terminals and the remote devices, such that optimal MSS values may be implemented with existing TCP protocols.

The following describes how the access point 130 decides a maximum MSS value. First, the access point 130 can detect a maximum MSS value between the access point 130 and at least one subsequent device in advance, wherein the subsequent device may be a wireless controller, a remote tunnel endpoint, a web server (for example, a dynamic host configuration protocol (DHCP) server, a domain name system (DNS) server, or a captive portal server) and other server apparatus, and the access point 130 sets the detection result as a first MSS value. It should be noted that the first MSS value corresponds to the subsequent device connected to the access point 130 individually. Therefore, the first MSS value may be a value, a plurality of values, or a classification belonging to the MSS. For example, the first MMS values may comprise MSS values between the access point 130 and at least one server or channel. In addition, the access point 130 may also record all TCP MSS values of TCP sessions established by the access point 130 in advance, so the access point sets a minimum TCP MSS value among all the TCP MSS values as a second MSS value, wherein the second MSS value also belongs to an MSS value about the TCP session. The access point 130 compares the first MSS value and the second MSS value, and selects the minimum value from the first MSS value and the second MSS value to determine an initial maximum MSS value.

In another embodiment, if the access point 130 has used a previous MSS value in advance, the access point 130 compares the previous MSS value and the maximum MSS value and then selects a greater MSS value between those values to update the maximum MSS value.

After determining the initial maximum MSS value, the access point 130 intercepts a first TCP SYN message which is transmitted to the first remote device 120 by the first user terminal 110 when receiving and reading the packets from the user terminal, wherein the first TCP SYN message has an MSS value of the first user terminal. Subsequently, the access point 130 determines the MSS value of the first user terminal and the initial maximum MSS value according to the header and other related packet information. When the maximum MSS value is less than the MSS value of the first user terminal, the access point 130 updates the MSS value of the first user terminal as the maximum MSS value, and transmits the first TCP SYN message which indicates that the MSS value of the first user terminal is the maximum MSS value to the first remote device 120.

After receiving the first TCP SYN message, the first remote device 120 transmits a first TCP SYN-ACK message to the first user terminal 110, wherein the first TCP SYN-ACK message has an MSS value of the first remote device. Similarly, the access point 130 intercepts the first TCP SYN-ACK message by reading the packet. Then, the access point 130 determines the MSS value of the first remote device and the maximum MSS value. When the maximum MSS value is less than the MSS value of the first remote device, the access point 130 updates the MSS value of the first remote device as the maximum MSS value, and transmits the first TCP SYN-ACK message to the first user terminal.

In another embodiment, the access point 130 may update the previous MSS value and the lowest TCP MSS values among all TCP sessions after reading and comparing the TCP/TCP SYN-ACK message, and stores all the MSS values into a device MSS table. The device MSS table can be a memory device or module installed in the access point 130, such as a flash memory, or the device MSS table may also be other network device connected to the access point, which is not limited herein. The access point 130 further detects an optimal MSS value of the user terminal between the access point 130 and the user terminal by using an MSS detection threshold, and an optimal MSS value of the remote device between the access point 130 and the remote device. In other words, the access point 130 uses a predetermined MSS detection threshold as a standard, which can be used to compare the MSS value between the user terminal and the access point 130, and between the remote device and the access point 130. Then, the access point 130 determines whether the MSS values have reached an optimal value. When the optimal MSS value of the user terminal reaching the predetermined MSS detection threshold is greater than the previous MSS value, the access point 130 updates the previous MSS value as the optimal MSS value of the user terminal. When the optimal MSS value of the user terminal is less than the minimum MSS value, the access point 130 updates the minimum MSS value as the optimal MSS value of the user terminal. Similarly, when the optimal MSS value of the remote device reaching the predetermined MSS detection threshold is greater than the previous MSS value, the access point 130 updates the previous MSS value as the optimal MSS value of the remote device. When the optimal MSS value of the remote device is less than the minimum MSS value, the access point 130 updates the minimum MSS value as the optimal MSS value of the remote device. The efficiency of determining the maximum MSS value can be improved by using the MSS detection threshold in the present invention.

Figure 2:
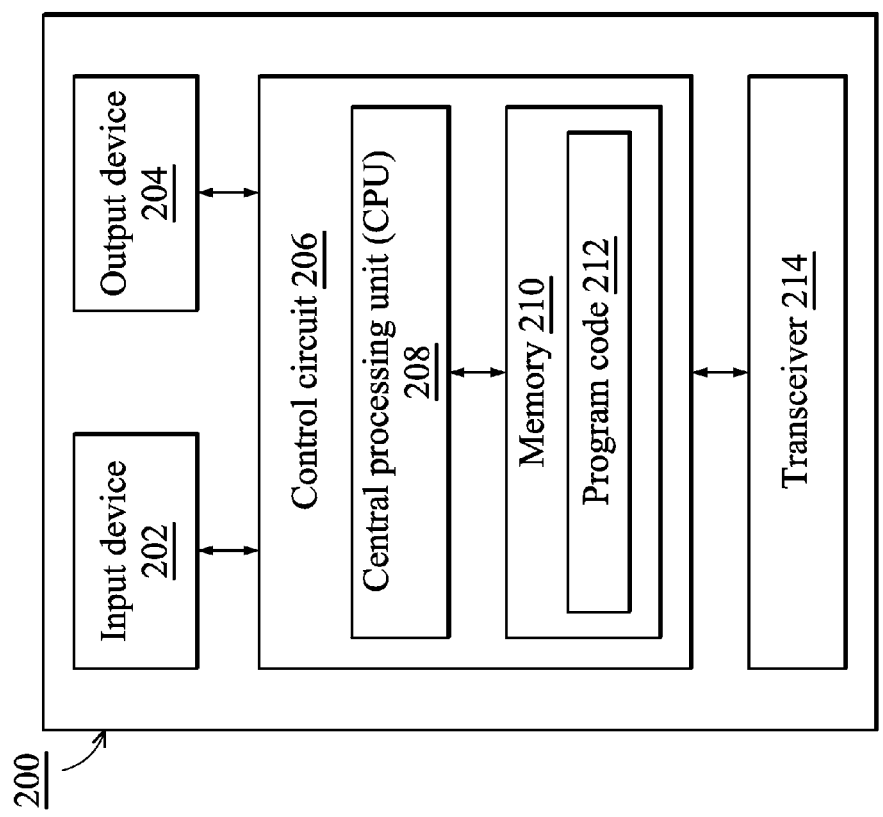
FIG. 2 shows an alternative simplified functional block diagram of a communication device according to one embodiment of the invention.

Turning to FIG. 2, FIG. 2 shows an alternative simplified functional block diagram of a communication device 200 according to one embodiment of the invention. As shown in FIG. 2, the communication device 200 can be utilized for realizing the first user terminal 110, the second user terminal 112, the first remote device 120, the second remote device 122 and the access point 130 in FIG. 1. The communication device 200 may include an input device 202, an output device 204, a control circuit 206, a central processing unit (CPU) 208, a memory 210, a program code 212, and a transceiver 214. The control circuit 206 executes the program code 212 in the memory 210 through the CPU 208, thereby controlling an operation of the communications device 200. The communications device 200 can receive signals input by a user through the input device 202, such as a keyboard or keypad, and can output images and sounds through the output device 204, such as a monitor or speakers. The transceiver 214 is used to receive and transmit wireless signals, delivering received signals to the control circuit 206, and wirelessly outputting signals generated by the control circuit 206.

Figure 3:
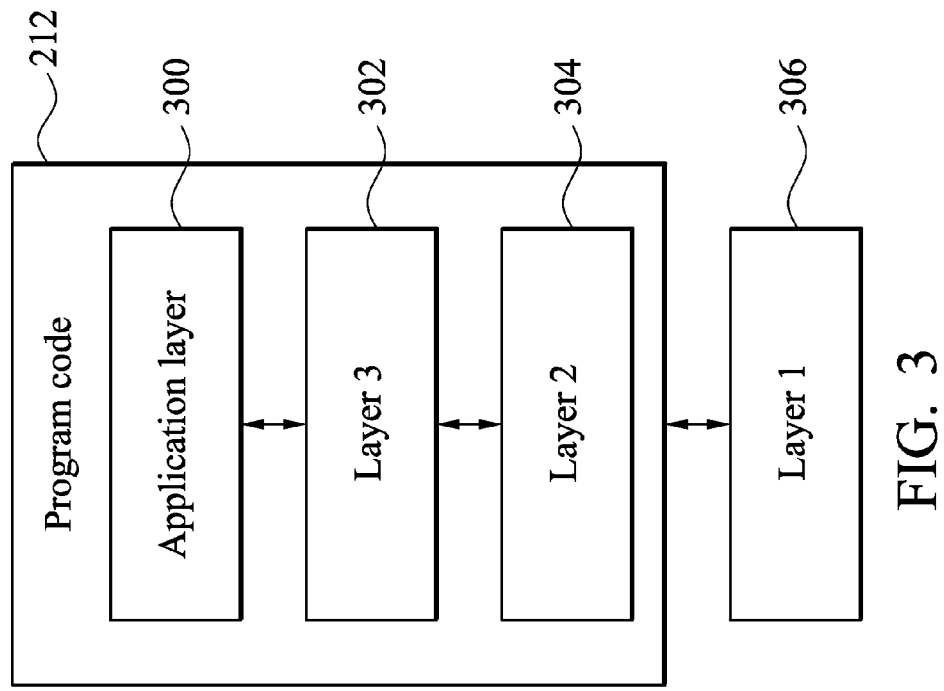
FIG. 3 is a functional block diagram of the program code of FIG. 2 according to one exemplary embodiment.

FIG. 3 is a simplified block diagram of the program code 212 shown in FIG. 2 in accordance with one embodiment of the invention. In this embodiment, the program code 212 includes an application layer 300, a Layer 3 portion 302, and a Layer 2 portion 304, and is coupled to a Layer 1 portion 306. The Layer 3 portion 302 generally performs radio resource control. The Layer 2 portion 304 generally performs link control. The Layer 1 portion 306 generally performs physical connections. In addition, the CPU 208 can execute the program code 212 to perform all of the above-described actions and steps or others described herein.

Figure 4:
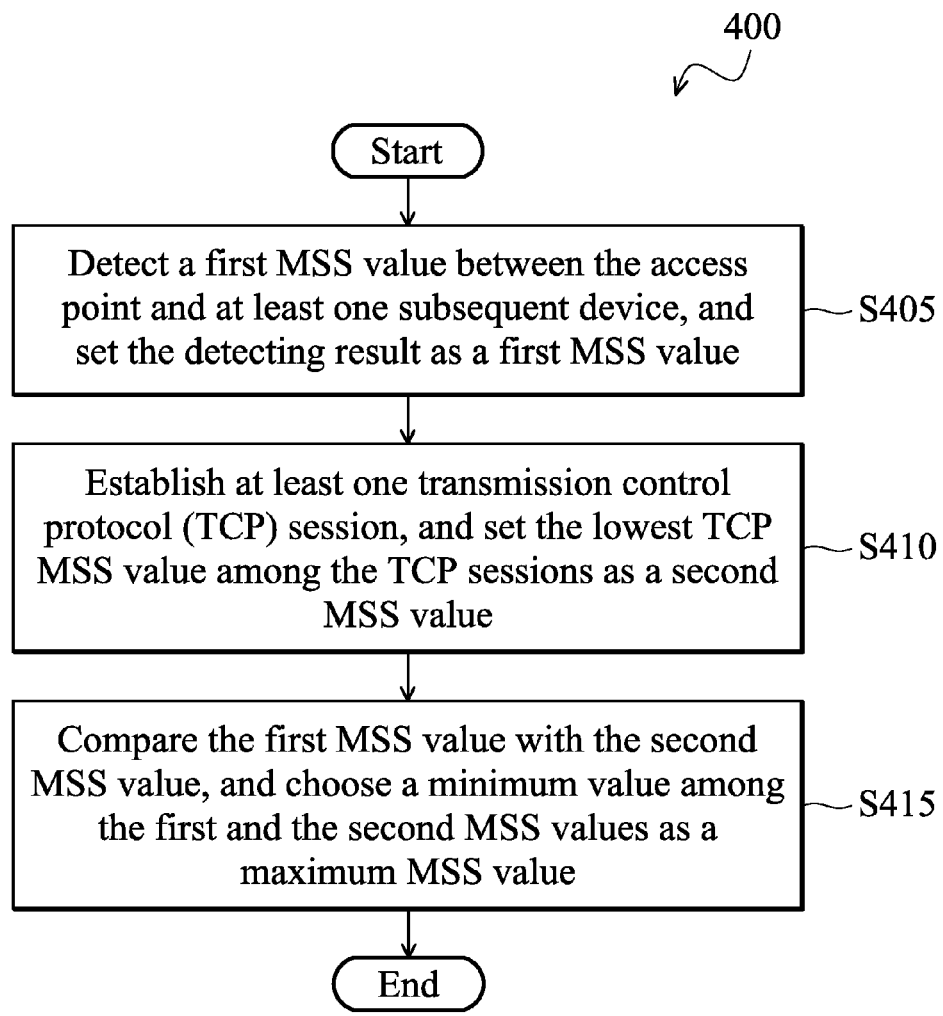
FIG. 4 is a flow diagram illustrating a method for determining a maximum segment size (MSS) according to the embodiment of the present invention.

FIG. 4 is a flow diagram 400 illustrating a method for determining a maximum segment size (MSS) according to the embodiment of the present invention. The method is used in an access point. In step S405, the access point detects a first MSS value between the access point and at least one subsequent device, and sets the detecting result as a first MSS value. In step S410, the access point establishes at least one transmission control protocol (TCP) session, and sets the lowest TCP MSS value among the TCP sessions as a second MSS value. Finally, in step S415, the access point compares the first MSS value with the second MSS value, and chooses a minimum value among the first and the second MSS values as a maximum MSS value. In one embodiment, when there is a previous MSS value stored in the access point, the access point compares the previous MSS value with the minimum value, and obtains a maximum value between the previous MSS value and the minimum value. After obtaining the maximum MSS value, the access point updates the maximum MSS value as the maximum value.

Figure 5:
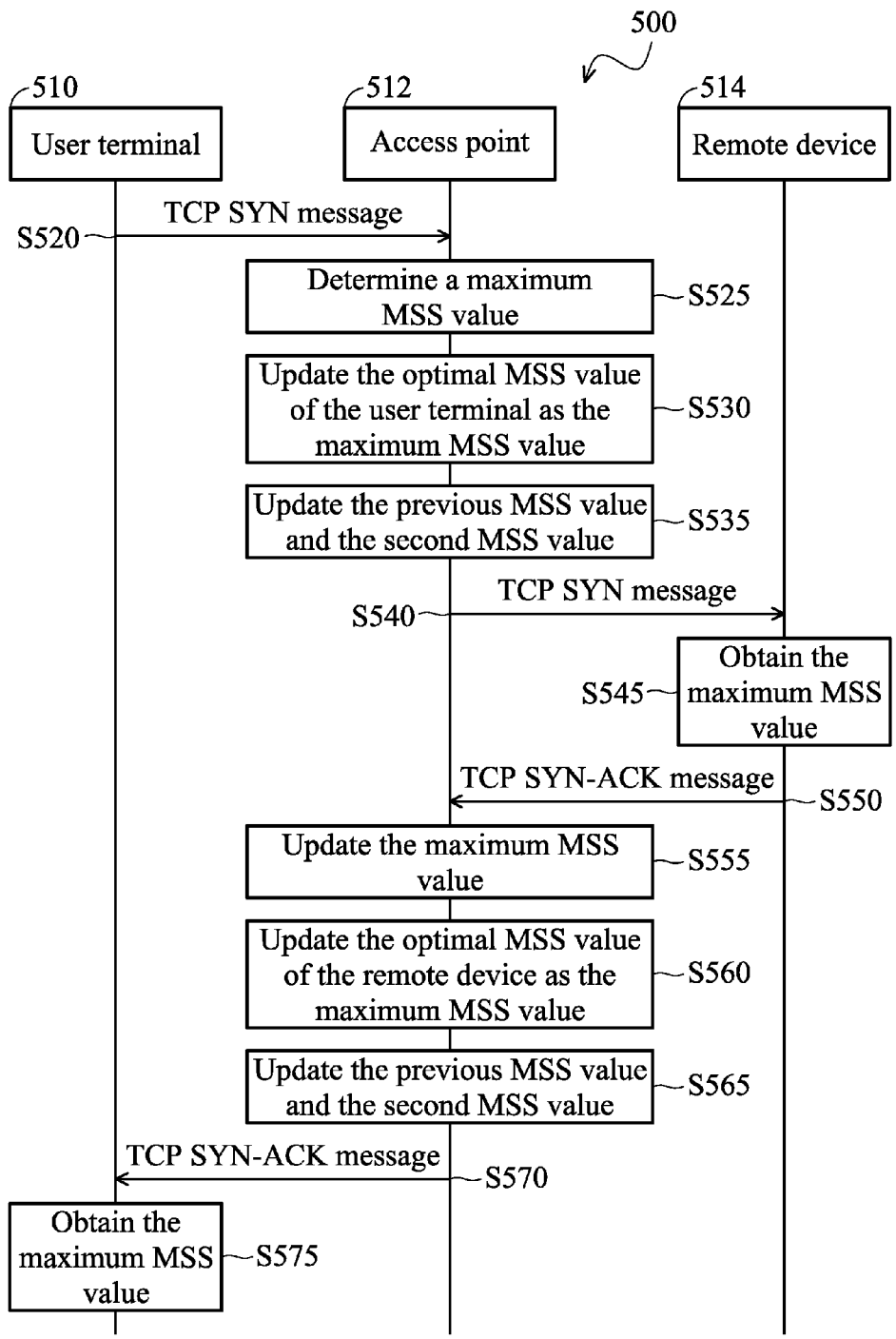
FIG. 5 is a message flow illustrating how the access point determines a maximum segment size (MSS) between the user terminal and the remote device according to the embodiment of the present invention.

FIG. 5 is a message flow 500 illustrating how the access point determining a maximum segment size (MSS) between the user terminal and the remote device according to the embodiment of the present invention. FIG. 5 comprises a user terminal 510, an access point 512 and a remote device 514. In step S520, the user terminal 510 transmits a TCP SYN message to the remote device 514, wherein the TCP SYN message has an MSS value of the user terminal. In step S525, the access point 512 intercepts the TCP SYN message, and detects an optimal MSS value of the user terminal by using an MSS detection threshold. The access point 512 further detects the MSS value between the access point 512 and at least one subsequent device, and compares the MSS value with a second MSS value among all the at least one established TCP session to obtain a minimum value among the MSS values. When there is a previous MSS value stored in the access point 512, the access point 512 compares the previous MSS value with the minimum value, and obtains a maximum value between the previous MSS value and the minimum value to determine a maximum MSS value. Subsequent, the access point 512 compares the optimal MSS value of the user terminal with the minimum value. In step S530, when the maximum MSS value is less the optimal MSS value of the user terminal, the access point 512 updates the optimal MSS value of the user terminal as the maximum MSS value; otherwise, the access point 512 does not need to update the maximum MSS value. In step S535, the access point 512 updates the previous MSS value and the second MSS value according to the optimal MSS value of the user terminal. In step S540, the access point 512 transmits the TCP SYN message to the remote device 514. In step S545, the remote device 514 obtains the maximum MSS value after receiving the TCP SYN message. Therefore, the MSS values of the TCP data transmitted from the remote device 514 to the user terminal 510 may not exceed the maximum MSS value.

Subsequent, in step S550, the remote device 514 transmits a TCP SYN-ACK message having an MSS value of the remote device to the user terminal 510. In step S555, the access point intercepts the TCP SYN message and detects an optimal MSS value of the remote device of the remote device 514 by using an MSS detection threshold. The access point 512 further detects a first MSS value between the access point 512 and at least one subsequent device, and updates the maximum MSS value. Then, the access point 512 compares the optimal MSS value of the user terminal and the maximum MSS value. It should be noted that it is assumed that the maximum MSS value is less than the optimal MSS value of the remote device in this embodiment. Subsequent, in step S560, the access point 512 updates the optimal MSS value of the remote device as the maximum MSS value. In step S565, the access point 512 updates the previous MSS value and the second MSS value according to the optimal MSS value of the remote device. In step S570, the access point 512 transmits a TCP SYN-ACK message to the user terminal 510. In step S575, the user terminal 510 obtains the maximum MSS value after receiving the TCP SYN-ACK message. Therefore, the MSS values of the TCP sessions transmitted from the user terminal 510 to the remote device 514 may not exceed the maximum MSS value.

As shown above, the access point automatically adjusts and updates the MSS values carried in the TCP SYN/TCP SYN-ACK messages by the method for determining an MSS value of the present invention. Therefore, it can not only avoid the inefficiencies caused by an MSS value that is set too low, but also avoid transmission errors caused by an MSS value that is set improperly.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein.

It should be understood that any specific order or hierarchy of steps in any disclosed process is an example of a sample approach. It should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described in connection with various aspects, it will be understood that the invention is capable of further modifications. This application is intended to cover any variations, uses, or adaptations of the invention following, in general, the principles of the invention, including such departures from the present disclosure as come within the known and customary practice within the art to which the invention pertains.

What is claimed is:

1. A method for determining a maximum segment size (MSS), used in an access point, comprising:
    detecting a first MSS value between the access point and at least one subsequent device;
    setting a transmission control protocol (TCP) MSS value of at least one TCP session established by the access point as a second MSS value;
    comparing the first MSS value with the second MSS value, and choosing a minimum value among the first MSS value and the second MSS value as a maximum MSS value;
    recording all the MSS values between the access point and the subsequent devices and the maximum MSS value into a device MSS table;
    intercepting a transmission control protocol synchronize (TCP SYN) message transmitted by a user terminal to a remote device, and intercepting a TCP synchronize-acknowledge (SYN-ACK) message transmitted by the remote device to the user terminal, wherein the TCP SYN message has an MSS value of the user terminal, and the TCP SYN-ACK message has an MSS value of the remote device;
    determining the MSS value of the user terminal and the maximum MSS value;
    updating the MSS value of the user terminal as maximum MSS value when the maximum MSS value is less than the MSS value of the user terminal;
    transmitting the TCP SYN messages to the remote device;
    determining the MSS value of the remote device and the maximum MSS value;
    updating the MSS value of the remote device as the maximum MSS value when the maximum MSS value is less than the MSS value of the remote device; and
    transmitting the TCP ACK message to the user terminal, wherein the method further comprises:
    comparing a previous MSS value with the minimum value, and obtaining a maximum value between the previous MSS value and the minimum value when there is the previous MSS value, wherein the previous MSS value is a comparison result indicating the result of comparing the MSS values between the user terminal and the access point, and between the remote device and the access point; and
    updating the maximum MSS value as the maximum value.

2. The method for determining a maximum segment size (MSS) as claimed in claim 1, further comprising:
    detecting an optimal MSS value of the user terminal by an MSS detection threshold;
    updating the previous MSS value as the optimal MSS value of the user terminal when the optimal MSS value of the user terminal is greater than the previous MSS value; and
    updating the second MSS value as the optimal MSS value of the user terminal when the optimal MSS value of the user terminal is less than the second MSS value.

3. The method for determining a maximum segment size (MSS) as claimed in claim 1, further comprising:
    using an MSS detection threshold by the access point to detect an optimal MSS value of the remote device between the access point and the remote device;
    updating the previous MSS value as the optimal MSS value of the remote device when the optimal MSS value of the remote device is greater than the previous MSS value; and
    updating the second MSS value as the optimal MSS value of the remote device when the optimal MSS value of the remote device is less than the second MSS value.

4. A method for determining a maximum segment size (MSS), used in a wireless communication system, comprising:
    detecting a first MSS value between an access point and at least one subsequent device by the access point;
    setting a transmission control protocol (TCP) MSS value of at least one TCP session established by the access point as a second MSS value;
    comparing the first MSS value with the second MSS value by the access point, and choosing a minimum value among the first and the second MSS values as a maximum MSS value;
    recording all the MSS values between the access point and the subsequent devices and the maximum MSS value into a device MSS table by the access point;
    transmitting a transmission control protocol synchronize (TCP SYN) message to a remote device by a user terminal, wherein the TCP SYN message has an MSS value of the user terminal;
    intercepting the TCP SYN message by the access point and determining the MSS value of the user terminal and the maximum MSS value; updating the MSS value of the user terminal as maximum MSS value and transmitting the TCP SYN message to the remote device when the maximum MSS value is less than the MSS value of the user terminal;
    transmitting a TCP synchronize-acknowledge (SYN-ACK) message to the user terminal by the remote device, wherein the TCP SYN-ACK message has an MSS value of the remote device;
    intercepting the TCP SYN-ACK message by the access point, and determining the MSS value of the remote device and the maximum MSS value; updating the MSS value of the remote device as the maximum MSS value when the maximum MSS value is less than the MSS value of the remote device; and transmitting the TCP ACK message to the user terminal; and
    receiving the TCP SYN-ACK message by the user terminal and obtaining the maximum MSS value,
    wherein the method further comprises:
    comparing a previous MSS value with the minimum value by the access point when the access point has the previous MSS value, and obtaining a maximum value between the previous MSS value and the minimum value, wherein the previous MSS value is a comparison result indicating the result of comparing the MSS values between the user terminal and the access point, and between the remote device and the access point; and
    updating the maximum MSS value as the maximum value by the access point.

5. The method for determining a maximum segment size (MSS) as claimed in claim 4, further comprising:
    using an MSS detection threshold by the access point to detect an optimal MSS value of the user terminal;

updating the previous MSS value as the optimal MSS value of the user terminal when the optimal MSS value of the user terminal is greater than the previous MSS value; and updating the second MSS value as the optimal MSS value of the user terminal by the access point when the optimal MSS value of the user terminal is less than the second MSS value.

6. The method for determining a maximum segment size (MSS) as claimed in claim 4, further comprising:

using an MSS detection threshold by the access point to detect an optimal MSS value of the remote device between the access point and the remote device;

updating the previous MSS value as the optimal MSS value of the remote device by the access point when the optimal MSS value of the remote device is greater than the previous MSS value; and updating the second MSS value as the optimal MSS value of the remote device by the access point when the optimal MSS value of the remote device is less than the second MSS value.

\* \* \* \* \*